(12) United States Patent
Shipway et al.

(10) Patent No.: US 11,472,978 B2
(45) Date of Patent: Oct. 18, 2022

(54) INK

(71) Applicant: DIP TECH LTD., Kfar Saba (IL)

(72) Inventors: Andy Shipway, Jerusalem (IL); Anna Lipkin, Kfar Saba (IL); David Dganit, Ahituv (IL); Lior Boguslavsky, Petach Tiqwa (IL); Matti Ben-Moshe, Reut (IL)

(73) Assignee: Dip-Tech, Ltd., Kfar Saba (IL)

( * ) Notice: Subject to any disclaimer, the term of this patent is extended or adjusted under 35 U.S.C. 154(b) by 552 days.

(21) Appl. No.: 16/605,055

(22) PCT Filed: Mar. 26, 2018

(86) PCT No.: PCT/IL2018/050343
§ 371 (c)(1),
(2) Date: Oct. 14, 2019

(87) PCT Pub. No.: WO2018/193438
PCT Pub. Date: Oct. 25, 2018

(65) Prior Publication Data
US 2021/0189163 A1 Jun. 24, 2021

Related U.S. Application Data

(60) Provisional application No. 62/486,556, filed on Apr. 18, 2017.

(51) Int. Cl.
*C09D 11/38* (2014.01)
*B41M 5/00* (2006.01)
(Continued)

(52) U.S. Cl.
CPC ............. *C09D 11/38* (2013.01); *B41M 5/007* (2013.01); *B41M 5/0047* (2013.01); *C08K 3/40* (2013.01);
(Continued)

(58) Field of Classification Search
CPC ....... C09D 11/36; C09D 11/02; C09D 11/033; B41M 5/007; B41M 5/0047; B41J 3/407;
(Continued)

(56) References Cited

U.S. PATENT DOCUMENTS 3,967,973 A * 7/1976 Francel .................. C03C 27/10
106/162.71
4,006,028 A * 2/1977 Nofziger ................ C03C 3/142
501/15
(Continued)

FOREIGN PATENT DOCUMENTS

CN 101573240 A 11/2009
CN 102597134 A 7/2012
(Continued)

OTHER PUBLICATIONS

International Search Report for PCT/IL2018/050343—dated Jul. 9, 2018.
(Continued)

*Primary Examiner* — John Zimmermann
(74) *Attorney, Agent, or Firm* — Rankin, Hill & Clark LLP; Christopher Jan Korff

(57) ABSTRACT

Disclosed is an inkjet ink that is jettable through standard inkjet nozzles, yet creates a non-abrasive non-porous three-dimensional glass structure on a 1-100 micron-scale without the need for additional processes beyond those normally used for the inkjet decoration of glass substrates. Such an inkjet ink can avoid the drawbacks noted above and is described herein.

27 Claims, 7 Drawing Sheets

(51) Int. Cl.
  *C08K 3/40* (2006.01)
  *C08K 5/053* (2006.01)
  *C08K 5/06* (2006.01)
  *C08K 5/1565* (2006.01)
  *C09D 11/033* (2014.01)
(52) U.S. Cl.
  CPC ............... *C08K 5/053* (2013.01); *C08K 5/06* (2013.01); *C08K 5/1565* (2013.01); *C09D 11/033* (2013.01); *C08K 2201/005* (2013.01)
(58) Field of Classification Search
  CPC ......... C09K 11/02; C03C 27/06; C03C 12/00; C03C 27/10; H01L 31/022425
  See application file for complete search history.

(56) References Cited

U.S. PATENT DOCUMENTS

| | | | | |
|---|---|---|---|---|
| 4,099,977 | A * | 7/1978 | Francel | C03C 12/00 501/15 |
| 2003/0089275 | A1 * | 5/2003 | Kawamura | C09K 11/025 252/301.4 R |
| 2008/0210122 | A1 * | 9/2008 | Magdassi | B41J 11/0015 523/160 |
| 2009/0181218 | A1 * | 7/2009 | Park | B41M 3/006 427/98.4 |
| 2009/0214840 | A1 | 8/2009 | Eron et al. | |
| 2013/0017388 | A1 | 1/2013 | Boguslavsky et al. | |
| 2015/0015638 | A1 | 1/2015 | Shipway et al. | |
| 2015/0096465 | A1 | 4/2015 | Shipway | |
| 2018/0158969 | A1 * | 6/2018 | Park | H01L 31/022425 |

FOREIGN PATENT DOCUMENTS

| | | | |
|---|---|---|---|
| ES | 2468553 A1 | 6/2014 | |
| WO | WO-2016110724 A1 * | 7/2016 | ........... C03C 17/007 |

OTHER PUBLICATIONS

Written Opinion of the ISA for PCT/IL2018/050343—dated Jul. 9, 2018.
Espacenet bibliographic data for CN 101573240 A published on Nov. 4, 2009, 1 page.
Espacenet bibliographic data for CN 10596854 A published on Sep. 28, 2016, 1 page.
Espacenet bibliographic data for ES 2 468 553 A1 published on Jun. 16, 2014, 1 page.

* cited by examiner

INK

CROSS-REFERENCE TO RELATED APPLICATIONS

This application is the U.S. national phase of PCT Application No. PCT/IL2018/050343 filed on Mar. 26, 2018, which claims priority to U.S. Provisional Patent Application No. 62/486,556 filed on Apr. 18, 2017, the disclosures of which are incorporated in their entirety by reference herein.

TECHNOLOGY FIELD

The present disclosure relates to ceramic inks and in particular to ceramic inkjet inks containing a carrier and particles that self-organize after printing to produce a three-dimensional microstructure that substantially mimics the properties of etched glass.

BACKGROUND

Frosted or etched glass is a glass the surface of which has been rendered opaque or translucent through a process which roughens or obscures the clear surface of the glass. Frosted glass is used in architecture for both external and internal applications to enhance the aesthetic appearance of windows, glass panels, glass doors, or glass cabinets. Conventionally, the frosted glass or opaque glass is produced by the sandblasting or acid etching of clear sheet glass. Other techniques used to produce a frosted glass surface include screen-printing and subsequent fusing of large (5-1000 microns) frit particles onto the substrate. Most techniques of rendering the glass surface translucent, form on the glass surface a three-dimensional pattern or microstructure that scatters the incident light during transmission, thus blurring visibility while still transmitting light. Alternatively, films including scattering particles can be used, though this approach tends to produce less pleasing effects. Typically, the known techniques cannot be used to produce arbitrary patterns without the preparation of a stencil or mask, and they are therefore not suitable for producing small quantities of frosted glass sheets with specific pattern of frosting.

Digital printing is a technology that allows arbitrary patterns and designs to be produced cost-effectively in print runs as low as single units. Inkjet printing is a digital printing process that is used successfully on glass to produce decoration with high resolution and print quality. Inkjet technology allows the printing of inks containing particles up to around 2 micron in diameter, and produces individual dots up to around 70 microns in diameter and 10 microns in thickness. This does not allow the production on glass surface of three-dimensional patterns that are required to mimic the structure of acid-etched glass.

Glass that has been chemically treated with hydrofluoric acid, is known to produce the "finest" of all conventional methods, giving a surface finish that will diffuse all transmitted light, reduce glare and will have a "frosted" appearance. A fine etched "satin" glass surface typically has a three-dimensional structure of peaks and valleys of 20 to 100 micron high. To form a microstructure similar to that of etched or frosted glass, "etch-effect" inks use other methods to cause light diffusion. These include introducing scattering particles into an enamel layer (U.S. Pat. No. 8,163,077) and introducing crystalline substances that produce a rough surface (U.S. Pat. Nos. 8,993,102 and 9,228,103) all to the assignee of the present application. Alternatively, inks that require post-processing can be used, for example that form glass bubbles that must be broken by scrubbing (U.S. Pat. No. 9,340,448) also to the assignee of the present application, or by printing "glue" that requires large particles to later be scattered over it.

All of these existing methods to produce an etched glass appearance by inkjet printing, suffer from problems including imperfect appearance, process issues (e.g. complexity or lack of robustness), and final product properties.

Glossary

As used in the current disclosure the term "immiscible liquids" means liquids that do not fully mix, for example oil and water. When two immiscible liquids are poured in a vessel the immiscible liquids result in two distinct layers, separated by a curved meniscus. Each layer has essentially the same volume and the same formulation as the original liquids, though they may dissolve partly into each other.

As used in the current disclosure the term "phase" means a part of a sample of liquid/matter that is in contact with other parts but is separate from them. Properties within a phase are homogeneous (uniform). For example, oil and water mixture contains two phases. Shaking the bottle breaks the phases up into tiny droplets, but there are still two distinct phases.

As used in the current disclosure the term "liquid" means a pure solvent or a solvent mixture, which may or may not also contain one or more solutes.

As used in the current disclosure the term PARALOID B-66 is a thermoplastic acrylic resin. As used in the current disclosure the term "PGDA" means propylene glycol diacetate.

SUMMARY

Disclosed is an inkjet ink that contains a number of liquids. The first and the second liquids are immiscible liquids. These immiscible liquids would naturally phase-separate, but the ink also contains a third liquid. The third liquid is facilitating formation of a mixture of the first and the second immiscible liquids into a single phase mixture. The third liquid is more volatile than the two immiscible liquids. Since the third liquid is more volatile than the first and second immiscible liquids, and evaporates faster than the two immiscible liquids, upon ink drying it supports the restoration of a phase-separated mixture of the first and second immiscible liquids.

The ink also contains glass frit particles. The glass frit particles naturally have a greater affinity for one or other of the two immiscible liquid phases that develop during drying. Thus the glass frit particles concentrate in one of the immiscible liquid phases to produce a pattern of glass frit-rich and glass frit-poor regions at the scale of the phase-separation.

The glass frit suspension in the ink is made inherently unstable such that it self-organizes spontaneously. Suspended glass frit particles in inkjet inks are usually stabilized by the use of dispersants and other materials that are positioned on the particle surface. The amount of dispersants used in the current ink is suboptimal to maintain the glass frit in a well-dispersed suspension. The suboptimal amount of dispersants results in glass frit that is prone to aggregation, which intensifies the formation of 1-100 micron-scale inhomogeneity in the ink as it dries.

The substrate bearing a dried ink pattern is fired in a typical tempering furnace, or by a similar process. During the firing, the glass frit melts and fuses to form the final layer providing the frosted glass visual impression. The glass frit is not sufficiently liquid to melt and level into a flat, homogeneous layer, so it keeps the bulk structure but fuses solid and loses sharp edges. The fused glass frit layer forms a non-abrasive and non-markable surface coating.

The use of a relatively high polymeric binder content enhances the visual etch or frost effect.

In some examples, dissolved salts are added to the ink formulations to form small crystals during drying. The crystals give a specific morphology to the final frost layer.

LIST OF FIGURES AND THEIR BRIEF DESCRIPTION

DESCRIPTION

Figure 1:
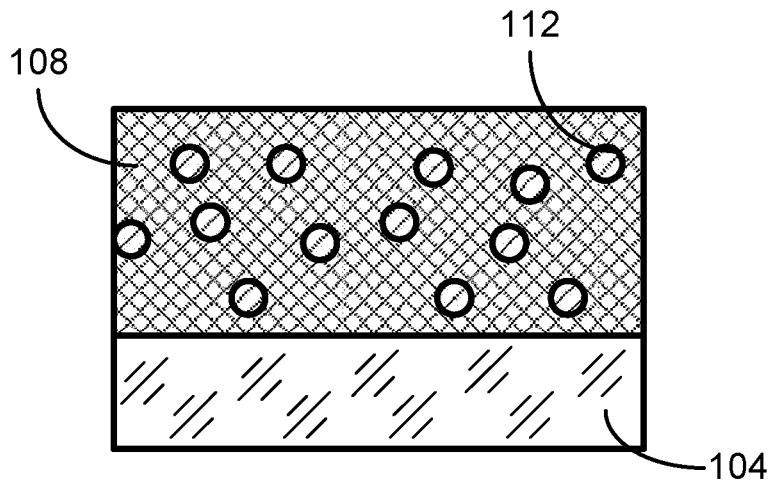
FIG. 1 is an example of liquid ink layer of surface of a substrate almost immediately after printing.

As noticed above, all of the previously existing methods to produce an etched glass appearance by inkjet printing, suffer from problems including imperfect appearance, process issues, and final product properties. The light that is incident on the glass should ideally be scattered only forwards through the glass, because a significant back-scattering of the incident light causes the appearance of whiteness of the etched surface of the glass. The three-dimensional pattern of peaks and valleys on the surface of the glass in some cases makes the surface abrasive. Touching such a surface with another substance or sliding another substance on it leaves certain fingerprints (traces), or marks the surface by the abraded substance. An imperfect and partially flat front surface reflects an amount of the incident light, and causes gloss (which is not desirable for a etched glass appearance). Inkjet printers are not perfect and their imperfections affect reproducibility of printed etched surface. Excessive direct light transmission, through imperfectly etched miniature glass surface areas is lessening the "privacy" function of the final product.

The current application discloses an inkjet ink that is jettable through standard inkjet nozzles, yet creates a non-abrasive three-dimensional glass structure on a 5-100 micron-scale without the need for additional processes beyond those normally used for the inkjet decoration of glass substrates. Such an inkjet ink can avoid the drawbacks noted above and is described herein.

In order to produce structure at a larger length scale that the inkjet nozzle, an inkjet ink is formulated that self-organizes during drying to give an inhomogeneous pattern of particle aggregates. The ink example given below could achieve the desired result by using an ink disclosed in one example or employing a mix of the ink examples.

According to an example, the current ink contains three liquids. The first and the second liquids are immiscible liquids. These immiscible liquids would naturally phase-separate, but the ink also contains a third liquid that facilitates the formation of a mixture of the first and the second immiscible liquids into a single phase mixture. The third liquid is more volatile than the two immiscible liquids. Since the third liquid is more volatile than the first and second immiscible liquids, and dries out faster than the two immiscible liquids and upon ink drying supports restoration of a phase-separate mixture of the first and second immiscible liquids.

As an example, the immiscible liquids could be glycerol ($C_3H_8O_3$) and propylene carbonate ($C_4H_6O_3$) and the third liquid may be solketal ((2,2-dimethyl-1,3-dioxolan-4-yl) methanol). As it is understood from the above example, the immiscible liquids could be polar liquids such as glycerol and non-polar liquids such as Propylene carbonate. As it will be described below other solvents and solvent mixtures of both polar and non-polar nature could be used for the current ink formulation.

Inkjet printheads operate properly when the ink contains a single liquid phase. This is achieved on account of the third liquid. After printing, the ink begins to dry. The third liquid (solketal) is more volatile (it has a faster evaporation rate) than the two immiscible liquids and therefore it is lost from the ink rapidly during drying. The third solvent is sufficiently volatile that during ink drying a phase-separation of the first and second immiscible liquids occurs.

Below are examples of evaporation rates of some ink ingredients. Evaporation rates are typically quoted relative to the evaporation of butyl acetate (BuAc=1.0). Lower numbers denote slower evaporation and higher number denote more rapid evaporation. Evaporation rates for some key solvents are:

Components of "Polar Liquids":
Trimethylolethane: <0.001
Trimethylolpropane: <0.001
Glycerol: ¬0.001
Propylene glycol: 0.01
Dipropylene glycol: 0.002
Components of "Nonpolar liquids":
Tributyl phosphate: ¬0.001
Propylene carbonate: 0.004
Diethyl malonate: 0.01
Dimethyl malonate: 0.04
Components of "Third liquids":
Solketal: 0.03
DPM (2-Methoxymethylethoxypropanol): 0.04
Cyclohexanol: 0.08
Diacetone alcohol: 0.15

Evaporation rates for each component in mixtures are complex to model, but are slower for components present at a lower concentrations. Water (polar liquid) has a rate of 0.3, but this is much decreased by when humectants are present (e.g. salts, glycerol).

Ink drying begins as soon as drops are ejected from the printer nozzles. Because of the high surface area-to-volume ratio of the drops, it can proceed rapidly, particularly if heated printheads are utilized. Typically, ink drying is also accelerated during printing by other methods such as substrate heating, air flow, and heat application. After printing, drying is generally continued with the application of heat, for example in an oven at 120 C, until all volatile solvents have evaporated. The acceleration of drying is advantageous as it helps to prevent problems such as ink bleed and defects from dust landing on wet ink.

Figure 2:
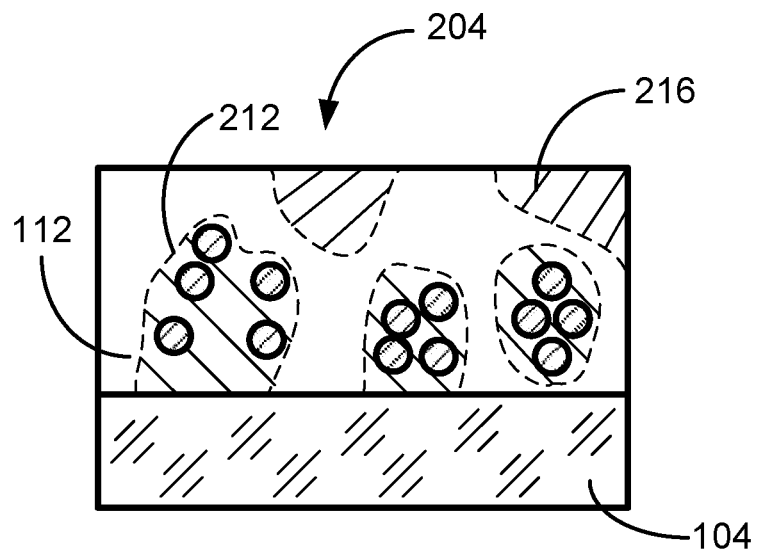
FIG. 2 is an example of a stage in liquid ink layer drying.

The resulting change in the ink formulation upon the initial stages of drying means that the two immiscible liquids are no longer able to mix, and therefore a phase separation occurs or is restored. Because of fluid dynamics and kinetics, the scale of the phase separation is determined to some extent by the ink layer 108 thickness deposited on the substrate 104 (FIG. 1). Numeral 112 marks glass frit particles. With a 10-50 micron ink layer thickness, a phase separation at a scale larger than a few hundred microns is not kinetically favourable, and therefore a dried ink pattern 204 (FIG. 2) at the desired scale of 10 to 50 microns is formed.

As the ink deposited on the substrate surface continues to dry, the amount of liquid is reduced and the viscosity of the remaining liquid increases. This viscosity increase is intensified when a large binder content is used. The increase in viscosity serves to stabilize and maintain on the surface of the substrate the ink pattern formed 204.

Figure 3:
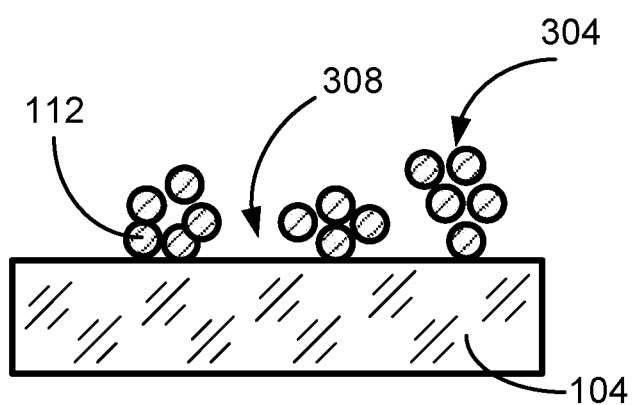
FIG. 3 is an example of a further stage in liquid ink drying.

The ink also contains glass frit particles 112. The glass frit particles naturally have a greater affinity for one or other of the two immiscible liquid phases 212 and 216 that develop during drying. Thus they concentrate (FIG. 3) in one of the immiscible liquid phases, resulting in a pattern of glass frit-rich 304 and glass frit-poor 308 regions at the scale of the phase-separation. As the remaining solvents dry to completion, this pattern is intensified and stabilized. The glass frit used in the current ink formulation could be Zinc based frit and/or Bismuth based frit and a mixture of Zinc based frit and Bismuth based frit. The glass frit is milled to an average particle size (D50) of less than 2 microns.

Figure 8:
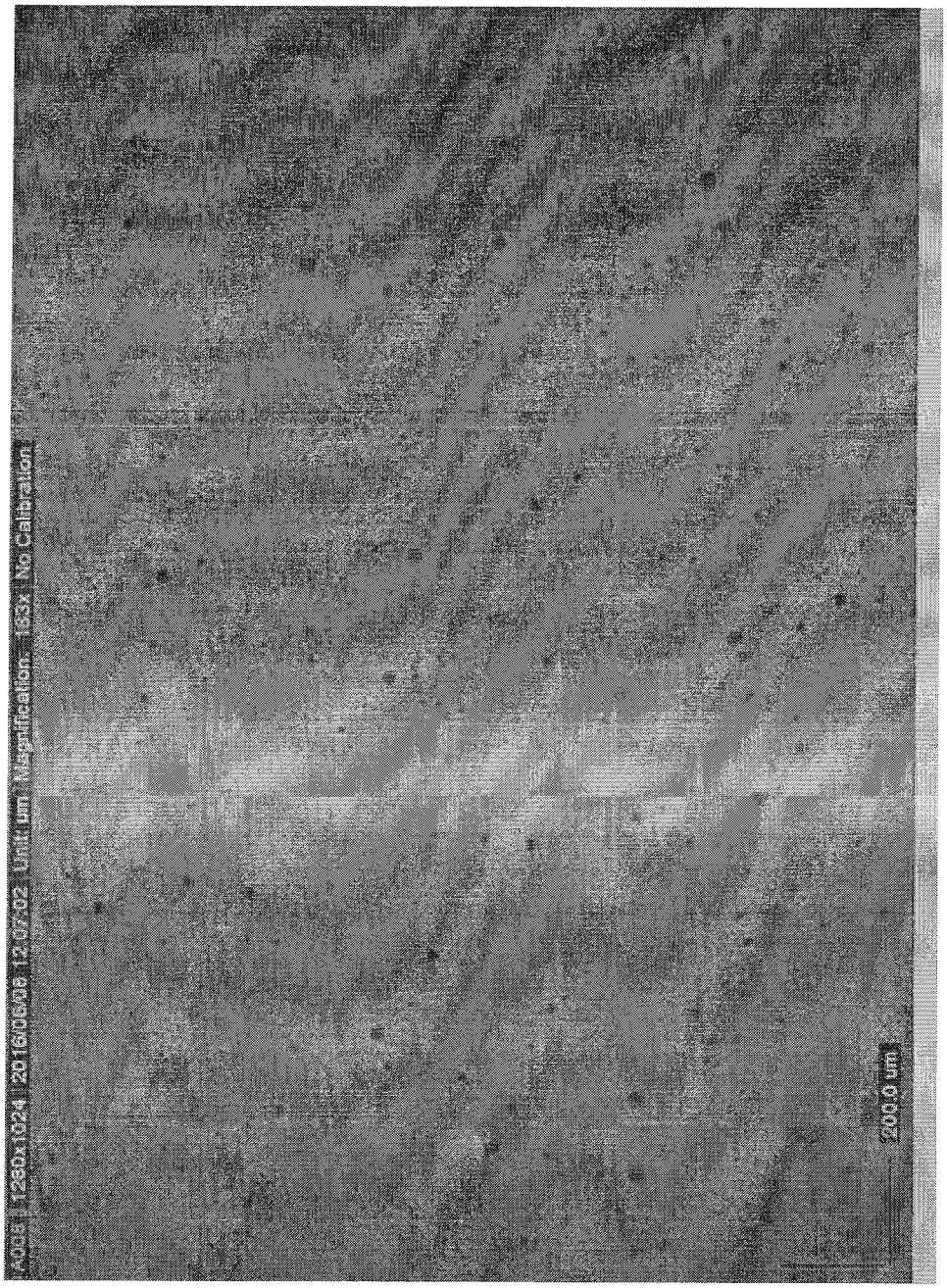
FIG. 8 is a micrograph of the same ink (Batch Number M75-163) after firing.
Figure 9:
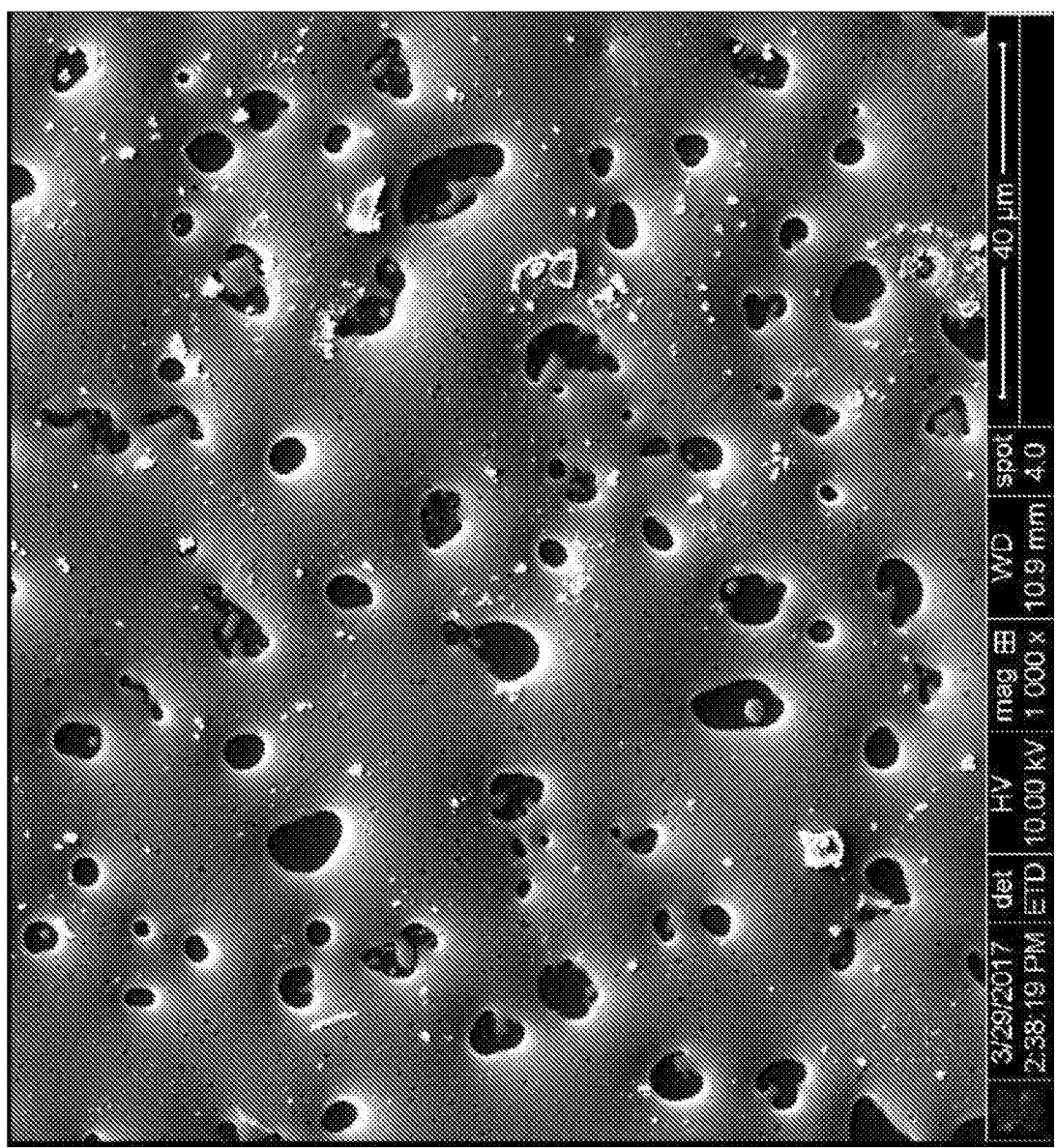
FIG. 9 is a micrograph of another ink (Batch Number M92-133 after firing.

The substrate 100 bearing the dried ink pattern is fired in a typical tempering furnace, or by a similar process. During the firing, all organic materials burn away and the glass frit melts and fuses to form the final layer 404 providing the frosted glass visual impression. The glass frit is not sufficiently liquid to melt into a homogeneous layer, so it retains its bulk structure but fuses solid and loses sharp edges. The fused glass frit forms a type of undulated coating that is continuous over the area of the substrate where the ink was deposited. Thus the final result is a non-abrasive, non-porous and non-markable coating. (A micrograph of the final result is given in FIGS. 6 and 8.)

According to an additional example, the glass frit suspension in the ink is made inherently unstable such that it self-organizes spontaneously. Suspended glass frit particles 112 in inkjet inks are usually stabilized by the use of dispersants and other materials that are positioned on the particle surface. Generally, the type and quantity of these materials are optimized to minimize any frit particle-particle interactions. Typically, minimization of frit particle-particle interactions may be achieved e.g. by titration of the dispersant quantity against the dispersion viscosity or sedimentation rate.

According to the method, the glass frit suspension in the ink is made inherently unstable by using a sub-optimal amount of dispersant, such that the glass frit particles interact with each other to an extent that causes aggregation when the ink is not under shear.

In the normal operation of an inkjet printer, ink is constantly moving/flowing, for example through tubes and printhead nozzles. When an inkjet printer uses an ink loaded with glass frit or ceramic particles, particle sedimentation is a particular problem. In order to prevent particle sedimentation the ink is constantly moved, even to the extent of stirring or shaking the ink in ink storage tanks.

The strength of glass frit particle-particle interactions in the ink is engineered such that the shear supplied by normal inkjet printer operation is sufficient to maintain particle separation and suspension, but such that aggregation takes place rapidly under zero shear conditions. This is achieved by the choice of dispersant and the minimization of the dispersant quantity.

The result of this ink engineering is to produce an ink that behaves as required in the inkjet printer to allow normal operation, but after depositing on the substrate the particles aggregate to form a larger scale structure. In the case of glass frit particles with an individual size of around 1 micron, aggregates can typically be up to a few hundred microns in size.

In a further example, any of the described above ink formulations could include a material that crystallizes upon the drying of the ink. This can be considered to be a special case of a phase separation. As an example, if the ink contains dissolved salts e.g. sodium or potassium nitrate, magnesium sulphate or a mixture of different salts. When the ink dries the salts crystallize into fine needles and other shapes. Inclusion in the ink of salts enhances the frosted appearance of the glass substrate surface.

Use of dissolved salts to form small crystals during drying that gives the frosted surface a specific morphology.

Figure 6:
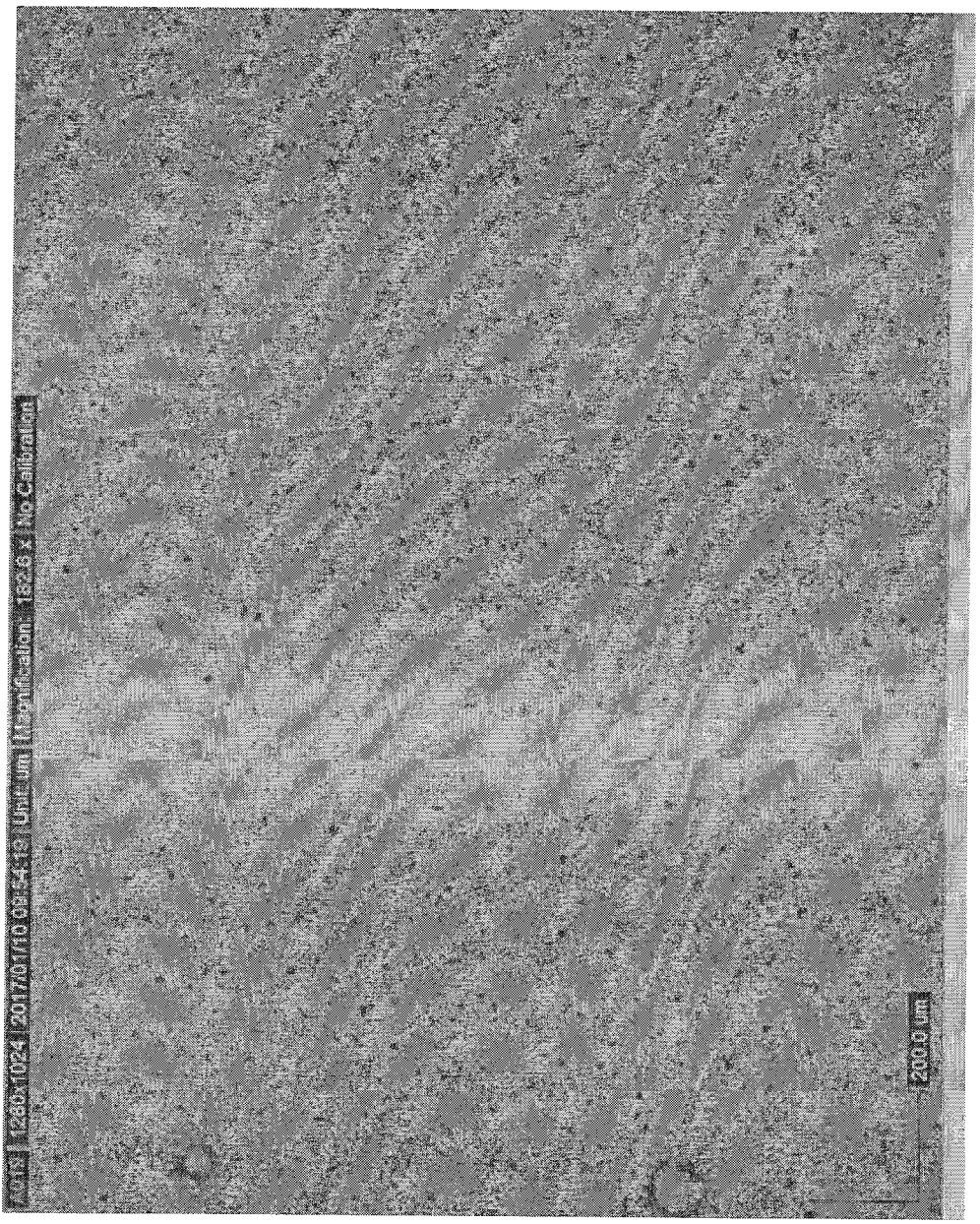
FIG. 6 is a micrograph of the same ink (Batch Number M78-198) after firing. The micrograph is showing essentially the same structure as observed before firing.
Figure 7:
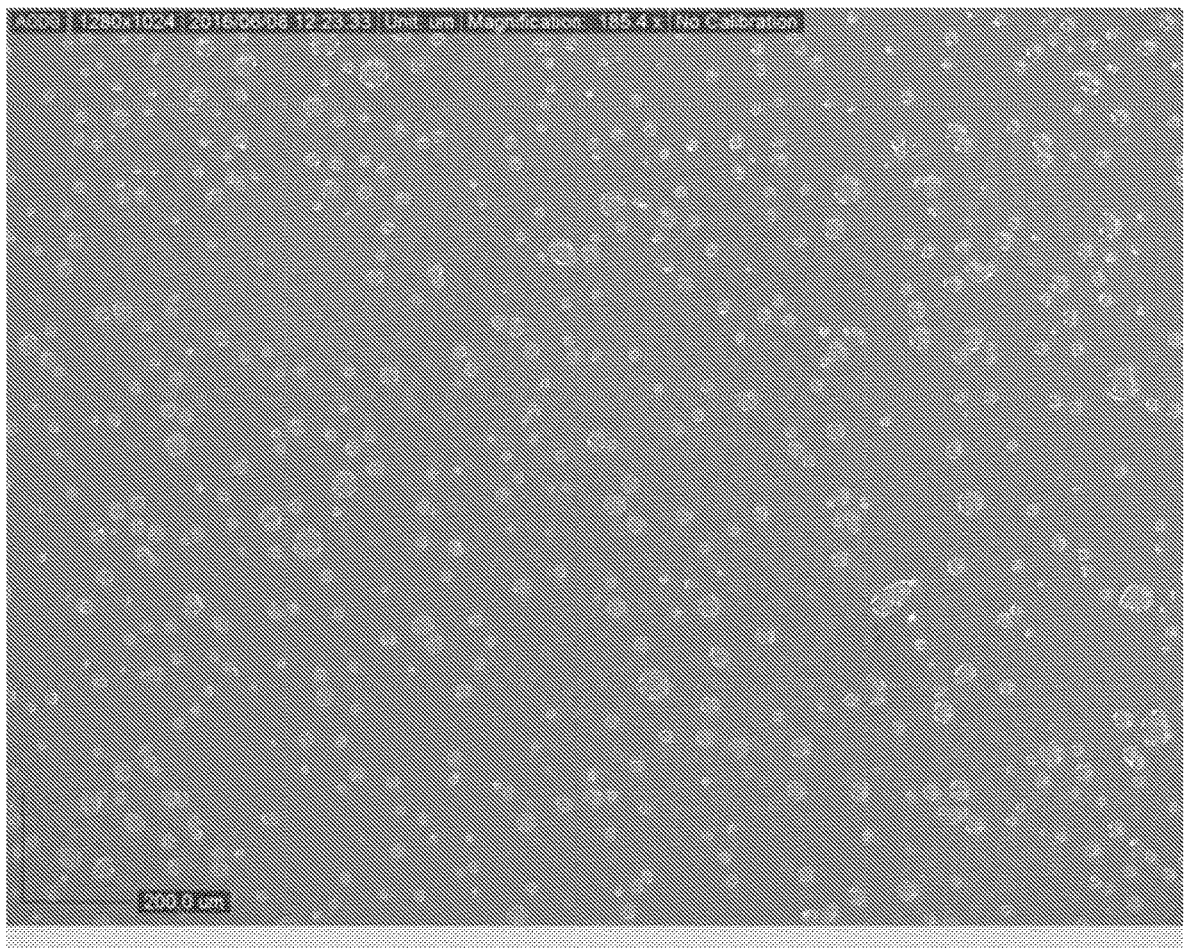
FIG. 7 is a micrograph of another ink (Batch Number M75-163) before firing.

The above examples of the ink each alone allow to formulate an ink that dries to give an etch-forming structure of frit particles. However, the two examples could work together to give an optimized ink. FIG. 6(?) shows a micrograph of a dried ink layer, demonstrating the scale and morphology of the self-organized etch-forming structure of frit particle aggregates. For different inks, slightly different structures are obtained, allowing the ink to be tuned according to the precise application requirements.

Figure 4:
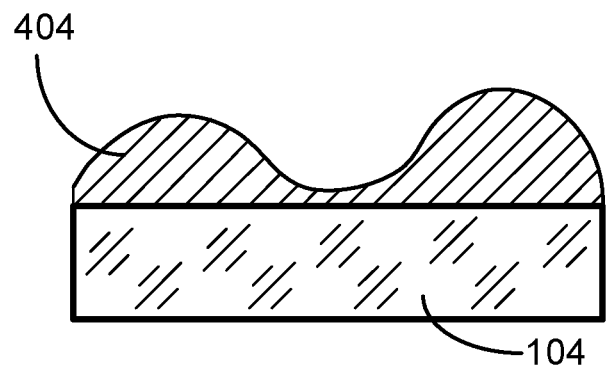
FIG. 4 is an example illustrating a fired ink layer on a surface of a substrate.
Figure 5:
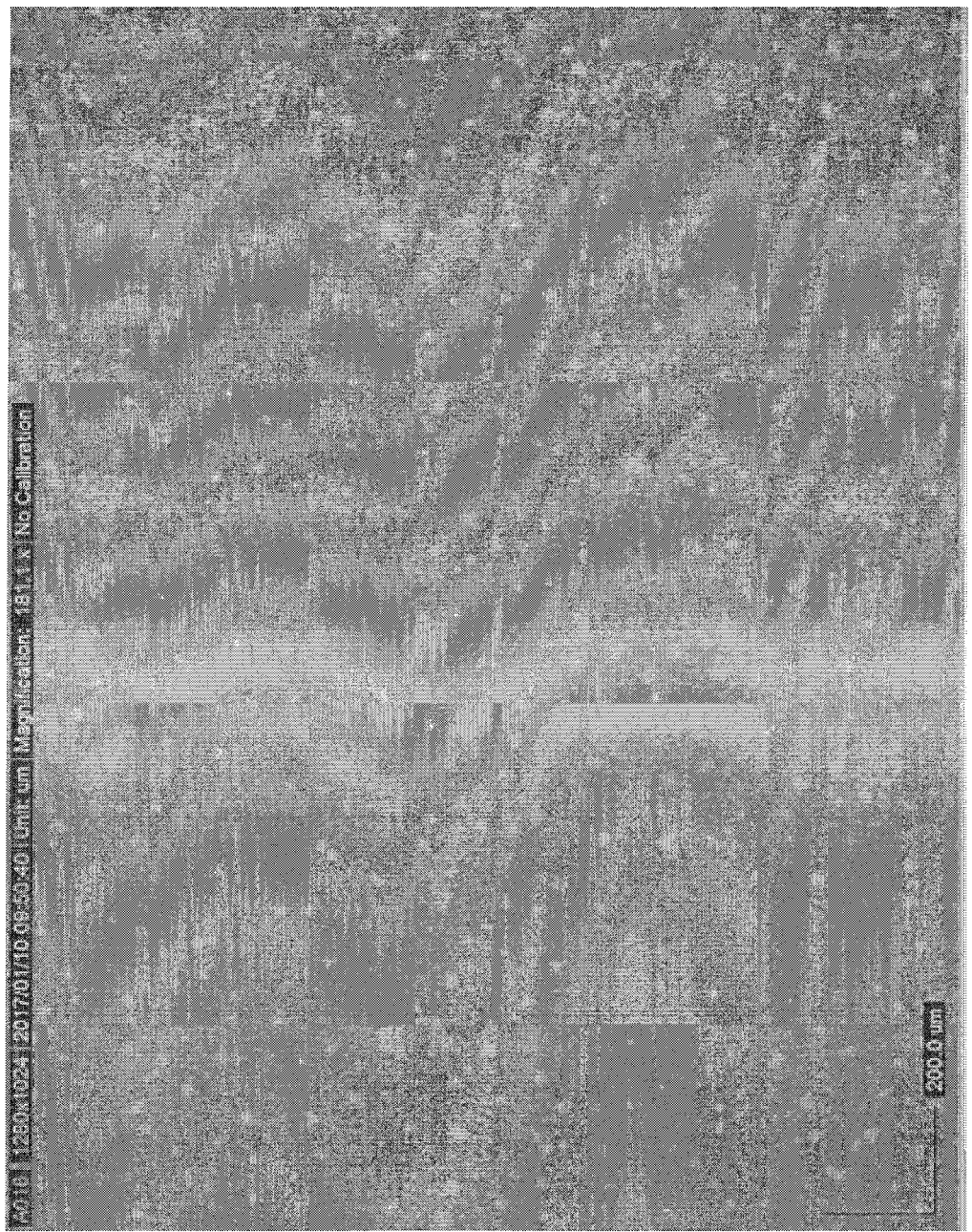
FIG. 5 is a micrograph of a dried but unfired ink (Batch Number M78-198), deposited on a glass surface. The micrograph demonstrates that the micron-scale structure of aggregated particles is formed before firing.

The substrate bearing the dried ink pattern is fired in a typical tempering furnace, or by a similar process. During this procedure, all organic materials burn away and the glass frit melts and fuses to form the final product. The glass frit is not sufficiently liquid to melt into a homogeneous layer 404 (FIG. 4), so it keeps the bulk structure, but fuses solid and loses sharp edges. Thus the final result is a non-abrasive, non-porous, transparent, and non-markable glass frit layer.

An ink formulated according to the examples above tends to result in a low viscosity ink with a tendency to bleed strongly, since the glass frit particles loading is relatively low and the ink is composed mainly of solvent. Glass is a non-absorbing substrate, so the ink deposited on the glass surface must be mechanically stable in the place it is deposited until it dries. In order to achieve this need, an unusually high quantity of polymeric binder (up to 4%) may be used. Use of a high polymeric binder content helps in enhancing the etch effect.

In addition, the solvent "solketal" ((2,2-dimethyl-1,3-dioxolan-4-yl)methanol) may be employed, particularly as all or part of the "third liquid", since it has an unusually high viscosity of 11 cP while being relatively fast evaporating. Likewise, cyclohexanol as a "third liquid" is of particular use since it has a relatively fast evaporation rate and a viscosity of 41 cP.

The binder used may also contribute to one of the immiscible liquids in the case that it is only soluble in one of them.

Other additives are added as required e.g. to tune the surface tension (polymeric fluorocarbon or silicone-containing materials such as BYK-333, BYK-342, BYK-307) and other drying parameters (e.g. levelling agents such as BYK-358, BYK-361) (anti-foaming agents, thixotropic additives such as BYK-410) according to the precise needs of the printhead and the application.

The two immiscible liquids are typically one polar solvent and one nonpolar solvent. Non-limiting examples of suitable liquids or components of them are:

The first or polar liquid: Glycerol ($C_3H_8O_3$); Water, optionally containing dissolved salts; Ethylene glycol ($C_2H_6O_2$); Propylene glycol ($C_3H_8O_2$); Diethylene glycol (($HOCH_2CH_2)_2O$); Pentaerythritol ($C_5H_{12}O_4$); Trimethylol propane ($CH_3CH_2C(CH_2OH)_3$); Trimethylol ethane ($CH_3C(CH_2OH)_3$).

The second or nonpolar liquid: Propylene carbonate ($C_4H_6O_3$); Dipropyl carbonate ($(CH_3CH_2CH_2O)_2CO$); Tributyl phosphate (($CH_3CH_2CH_2CH_2O)_3PO$); Ethylhexyl acetate ($C_{10}H_{20}O_2$); Isobornyl acetate ($C_{12}H_{20}O_2$); Isoparaffins (with C13-14); Aliphatic hydrocarbons larger than C8; diethyl malonate ($CH_2(COOC_2H_5)_2$); dimethyl malonate ($CH_2(COOCH_3)_2$).

Other, less nonpolar, solvents that may contribute to the nonpolar liquid include materials such as dipropylene glycol methyl ether acetate ($CH_3CO_2C_3H_6OC_3H_6OCH_3$) (DPMA), the "dibasic esters" (DBEs), and other aprotic ethers and esters The required third liquid properties could depend on the immiscible liquids chosen. The third liquid should be miscible with both the polar and the nonpolar liquid, to such an extent that it can bring them together into a single phase when all three liquids are mixed. Its evaporation rate should be such that, as the ink dries, the solvent formulation changes sufficiently to provoke a phase separation between liquid phases containing the polar and the nonpolar liquids. Generally this means that the third liquid has an evaporation rate faster than that of the polar or the nonpolar liquid. Typically the third liquid is an alcohol, and non-limiting examples include: Dipropylene glycol methyl ether ($CH_3OCH_2CH(OH)CH_3$); Solketal ($O_{10}H_{16}O_4$); Propylene glycol methyl ether ($CH_3OCH_2CH(OH)CH_3$); Propylene glycol butyl ether ($CH_3(CH_2)_3OC_3H_6OH$); Diacetone alcohol ($(CH_3)_2C(OH)CH_2COCH_3$); Ethyl lactate $C_5H10O_3$; cyclohexanol ($CH_3(CH_2)_3OH$); n-butanol ($CH_3(CH_2)_3OH$).

The glass frit used in the formulations is a transparent glass frit free from lead or other toxic elements, and with a fusion temperature that allows it to be fused into a ceramic coating at less than 700° C. Frits based on Zinc and/or based on Bismuth can both be used. The frit is milled to an average particle size (D50) of less than 2 microns, and preferably less than 1 micron.

The various glass frits used in the examples are added as bead-milled slurries at around 70 wt % frit and an average particle size of D50=0.9 microns. Milling was carried out with various solvents and dispersants as shown below. Other frits, particle sizes, and milling recipes may also be used to produce inks the same frost effect. Details of the glass frits used are as follows:

| Frit name | Frit type | Solvent | Dispersant |
|---|---|---|---|
| Frit007 | Bismuth-based | DPM | Disperbyk-116 |
| Frit73-4-1 | Zinc-based (R&G) | DPMA | Disperbyk-145 |
| FritG | Bismuth-based (GCC) | DPM | Disperbyk-2059 |
| Frit66-97-1 | Zinc-based (JM) | DPMA | Disperbyk-145 |
| Frit001 | Bismuth-based | DPM | Disperbyk-180 |
| Frit3110 | Borisilicate (Ferro) | DMM | Disperbyk-118 |

The following examples represent a selection of inks that, when deposited on the glass surface and fired, demonstrate a good "etch effect" (unless otherwise noted), formulated using various frits, dispersants, "liquids", and other ingredient concentrations.

Formulation Using Low Quantities of the Three Key Liquids (51-72-1):

| Ingredient | Type | Amount |
|---|---|---|
| Glycerol | Polar liquid | 3% |
| Propylene carbonate | Nonpolar liquid | 1.5% |
| Solketal | Third liquid | 18.2% |
| Frit007 | Frit slurry | 18% |
| Paraloid B66 | Polymeric Binder | 2% |
| DPMA | Non-functional solvent | 40% |
| PMA (Methoxy Propyl Acetate (PMA) $C_6H_{12}O_3$ | Delivery solvent for B66 | 8% |
| PGDA | Solvent | 1% |
| Diethyl carbonate | Solvent | 1% |
| Byk-342 (10% solution) | Surface tension modifier | 0.3% |

This ink gave a viscosity of 13.7 cP, a surface tension of 22.6 Dyne/cm, and a density of 1.15. It gave good print quality without any technical issues, and was tested using a Dimatix Galaxy print head.

Formulation Using High Quantities of the Immiscible Liquids (66-31-1):

| Ingredient | Type | Amount |
|---|---|---|
| Glycerol | Polar liquid | 12% |
| Propylene carbonate | Nonpolar liquid | 13% |
| Dimethyl malonate | Nonpolar liquid | 4% |
| Cyclohexanol | Third liquid | 21% |
| n-Butanol | Third liquid | 9% |
| Frit73-4-1 | Frit slurry | 20% |
| Paraloid B66 | Polymeric Binder | 1.6% |
| DPMA | Non-functional solvent | 5.25% |
| PMA | Delivery solvent for B66 | 13.4% |
| Disperbyk-118 | Dispersant | 0.5% |
| Byk-307 (1% solution) | Surface tension modifier | 0.25% |

This ink gave a viscosity of 11.2 cP.

Formulation Using a High Frit Content (66-25-2):

| Ingredient | Type | Amount |
|---|---|---|
| Glycerol | Polar liquid | 9.6% |
| Propylene carbonate | Nonpolar liquid | 13.7% |
| Dimethyl malonate | Nonpolar liquid | 4% |
| Cyclohexanol | Third liquid | 16.8% |
| n-Butanol | Third liquid | 9% |
| Frit73-4-1 | Frit slurry | 34% |
| Paraloid B66 | Polymeric Binder | 1% |
| DPMA | Non-functional solvent | 3.5% |
| PMA | Delivery solvent for B66 | 8.5% |
| Disperbyk-118 | Dispersant | 1% |
| Byk-307 (1% solution) | Surface tension modifier | 0.25% |

This ink gave a viscosity of 13.4 cP.

Formulation Using a High Quantity of the Third Liquid (81-83-3):

| Ingredient | Type | Amount |
|---|---|---|
| Glycerol | Polar liquid | 3% |
| Propylene carbonate | Nonpolar liquid | 5% |
| Solketal | Third liquid | 64.4% |
| Frit73-4-1 | Frit slurry | 18% |
| Colacryl TS2109 | Polymeric Binder | 7% |

-continued

| Ingredient | Type | Amount |
|---|---|---|
| PGDA | Non-functional solvent | 1% |
| Diethyl carbonate | Non-functional solvent | 1% |
| Disperbyk-180 | Dispersant | 0.5% |
| Byk-342 (10% solution) | Surface tension modifier | 0.1% |

Verification of the Need for the Immiscible Liquids (81-65):

The following basic formulation as follows gave a pleasing etch effect.

| Ingredient | Type | Amount |
|---|---|---|
| Glycerol | Polar liquid | 3% |
| Propylene carbonate | Nonpolar liquid | 10% |
| Dimethyl malonate | Nonpolar liquid | 5% |
| Solketal | Third liquid | 38.65% |
| Diethyl carbonate | Nonfunctional solvent | 3% |
| FritG | Frit slurry | 28% |
| Paraloid B66 (25% in PMA) | Polymeric Binder | 15% |
| Disperbyk-180 | Dispersant | 0.15% |
| Byk-342 (10% solution) | Surface tension modifier | 0.2% |

Analogous formulations were prepared, (i) with the glycerol substituted with solketal, and (ii) with the propylene carbonate substituted with solketal. Ink (i), prepared without glycerol, gave no etch effect at all. Ink (ii), prepared with propylene carbonate, gave a poor etch effect. This experiment, in which each of the immiscible liquids was in turn removed resulting in a poor etch effect, demonstrates the requirement for the two immiscible liquids. (Note than in the second case only one of the two nonpolar liquids was substituted.)

Demonstration of the Advantage of High Binder Content (81-65-4):

| Ingredient | Type | Amount |
|---|---|---|
| Glycerol | Polar liquid | 3% |
| Propylene carbonate | Nonpolar liquid | 10% |
| Dimethyl malonate | Nonpolar liquid | 5% |
| Solketal | Third liquid | 35.65% |
| Diethyl carbonate | Nonfunctional solvent | 3% |
| FritG | Frit slurry | 28% |
| Paraloid B66 (5% in PMA) | Polymeric Binder | 15% |
| Disperbyk-180 | Dispersant | 0.15% |
| Byk-342 (10% solution) | Surface tension modifier | 0.2% |

This formulation is almost identical to the formulation in the previous example, but has a much lower binder content (added as a 5% solution rather than 25% solution). It results in an enamel with a very minimal etch effect.

Formulations with High Binder Content and Different Frits (66-132-1; 66-139-1):

| Ingredient | Type | Amount |
|---|---|---|
| Glycerol | Polar liquid | 3% |
| Propylene carbonate | Nonpolar liquid | 5% |
| Solketal | Third liquid | 54.9% |
| Frit66-97-1 | Frit slurry | 18% |
| B66 (20% solution in PMA) | Polymeric Binder | 15% |
| PGDA | Non-functional solvent | 1% |
| Diethyl carbonate | Non-functional solvent | 1% |
| Byk-342 (10% solution) | Surface tension modifier | 0.1% |

| Ingredient | Type | Amount |
|---|---|---|
| Glycerol | Polar liquid | 3% |
| Propylene carbonate | Nonpolar liquid | 5% |
| Solketal | Third liquid | 50.9% |
| Frit001 | Frit slurry | 24% |
| B66 (20% solution in CH) | Polymeric Binder | 15% |
| PGDA | Non-functional solvent | 1% |
| Diethyl carbonate | Non-functional solvent | 1% |
| Byk-342 (10% solution) | Surface tension modifier | 0.1% |

Formulations Using Nonpolar Liquids Other than PC (66-123-1; 66-123-2):

| Ingredient | Type | Amount |
|---|---|---|
| Glycerol | Polar liquid | 3% |
| Ethylhexyl acetate | Nonpolar liquid | 5% |
| Solketal | Third liquid | 59.9% |
| Frit66-97-1 | Frit slurry | 20% |
| B66 (20% solution in PMA) | Polymeric Binder | 10% |
| PGDA | Non-functional solvent | 1% |
| Diethyl carbonate | Non-functional solvent | 1% |
| Byk-342 (10% solution) | Surface tension modifier | 0.1% |

| Ingredient | Type | Amount |
|---|---|---|
| Glycerol | Polar liquid | 3% |
| Isobornyl acetate | Nonpolar liquid | 5% |
| Solketal | Third liquid | 59.9% |
| Frit66-97-1 | Frit slurry | 20% |
| B66 (20% solution in PMA) | Polymeric Binder | 10% |
| PGDA | Non-functional solvent | 1% |
| Diethyl carbonate | Non-functional solvent | 1% |
| Byk-342 (10% solution) | Surface tension modifier | 0.1% |

Formulation Using Alternative Materials for All Three Liquids and High Frit Content (65-150-1):

| Ingredient | Type | Amount |
|---|---|---|
| Trimethylol propane | Polar liquid | 15% |
| 2-ethylhexyl acetate | Nonpolar liquid | 25% |
| Butanol | Third liquid | 4.8% |
| Ethyl lactate | Third liquid | 5% |
| Frit66-97-1 | Frit slurry | 40% |
| B66 (20% in CH) | Binder solution | 10% |
| Byk-307 (1% solution) | Surface tension modifier | 0.2% |

The polar liquid phase in this case is based on a material (trimethylol propane) that is solid at room temperature. However, in the ink it is combined with the other solvents into a liquid form.

Formulation Using a Water-Based Polar Liquid and a Different Binder (M78-198):

| Ingredient | Type | Amount |
|---|---|---|
| Diethylene glycol | Polar liquid | 20.6% |
| Water | Polar liquid | 9.1% |
| Potassium nitrate | Polar liquid | 1.5% |
| Sodium nitrate | Polar liquid | 1.5% |
| Propylene carbonate | Nonpolar liquid | 13.0% |
| Dimethyl malonate | Nonpolar liquid | 2.6% |
| Ethyl lactate | Third liquid | 16.2% |
| Cyclohexanol | Third liquid | 15.4% |
| DPM | Third liquid | 9.8995% |
| Frit3110 | Frit slurry | 4.7% |

-continued

| Ingredient | Type | Amount |
| --- | --- | --- |
| Frit73-4-1 | Frit slurry | 3.0% |
| Laropal K80 (BASF) | Binder | 2.5% |
| BYK-145 | Dispersant | 0.00025% |
| BYK-307 | Surface tension modifier | 0.00025% |

The polar liquid in this case is an aqueous salt solution. The presence of the salts and diethylene glycol (a humectant) helps to reduce the water evaporation rate to a point where it is able to work to help produce the etch effect.

Formulation Demonstrating the Need for the Third Liquid (65-87-1):

| Ingredient | Type | Amount |
| --- | --- | --- |
| Glycerol | Polar liquid | 13.64% |
| Propylene carbonate | Nonpolar liquid | 13.64% |
| Dimethyl malonate | Nonpolar liquid | 3.65% |
| Cyclohexanol | Third liquid | 13.54% |
| Frit66-97-1 | Frit slurry | 36.35% |
| DPMA | Other solvent | 7.45% |
| B66 (20% in DEC) | Binder solution | 4.55% |
| B66 (20% in PMA) | Binder solution | 4.55% |
| PGDA | Other solvent | 1.00% |
| DEC (Diethyl Carbonate (OC(OCH$_2$CH$_3$)$_2$) | Other solvent | 0.91% |
| Dispex 4431 | Dispersant | 0.45% |
| Byk-307 (1% solution) | Surface tension modifier | 0.27% |

As used in the current disclosure Dispex® is efficient polyacrylate dispersant available from BASF.

This ink gives a good etch effect in drawdown. However, the "third liquid" is not sufficient to bring the immiscible liquids together into a single phase. Therefore the ink contains two liquid phases (as an emulsion). The result of this is that this ink failed in print-testing, being unable to be jetted by inkjet printheads.

The disclosed inks in the Examples have high incident light transmission, do not keep fingerprints and when touched, gives a silky touch feeling (Similar or better to Satin acid etching process). The inks can be applied on any type of glass.

What is claimed is:

1. An ink formulation, comprising:
   a first immiscible liquid;
   a second immiscible liquid; and
   wherein a mixture of the first and the second immiscible liquids is a phase-separated mixture;
   at least one glass frit; and
   a third liquid facilitating formation of a mixture of the first and the second immiscible liquids into a single phase mixture, wherein during ink drying the single phase mixture a phase-separation of the first and second immiscible liquids occurs.

2. The ink formulation of claim 1 wherein the first immiscible liquid is one of a group of liquids consisting of glycerol, water containing dissolved salts; Ethylene glycol; Propylene glycol; Diethylene glycol; Pentaerythritol; Trimethylol propane; Trimethylol ethane.

3. The ink formulation of claim 1 wherein the first immiscible liquid is a polar liquid.

4. The ink formulation of claim 1 wherein the second immiscible liquid is one of a group of liquids consisting of propylene carbonate, Dipropyl carbonate; Tributyl phosphate; Ethylhexyl acetate; Isobornyl acetate; Isoparaffins; Aliphatic hydrocarbons; dimethyl malonate and dipropylene glycol methyl ether acetate.

5. The ink formulation of claim 1 wherein the third liquid is one of a group of liquids consisting of ((2,2-dimethyl-1,3-dioxolan-4-yl)methanol), Dipropylene glycol methyl ether; Propylene glycol methyl ether; Propylene glycol butyl ether; Diacetone alcohol; Ethyl lactate; cyclohexanol; and n-butanol.

6. The ink formulation of claim 1 wherein glass frit particle-particle interactions that takes place in course of normal inkjet printer operation develops shear forces sufficient to maintain particle separation and suspension in the ink.

7. The ink formulation of claim 1 wherein glass frit particles aggregation takes place under zero shear conditions.

8. The ink formulation of claim 1 wherein glass frit particles aggregate to form clusters of a few hundred microns.

9. The ink formulation of claim 1 wherein fired ink forms on a glass surface a layer that scatters incident light in forward direction only (through the glass).

10. The ink formulation of claim 1 wherein fired ink forms on a glass surface a non-abrasive layer.

11. The ink formulation of claim 1 wherein fired ink forms on a glass surface a non-markable layer.

12. The ink formulation of claim 1 further comprising a binder soluble in at least one of the first and second immiscible liquids.

13. The ink formulation of claim 10 wherein third solvent ((2,2-dimethyl-1,3-dioxolan-4-yl)methanol) is employed as a binder.

14. The ink formulation of claim 1 further comprising additives and wherein the additives are at least one of a group of additives consisting of surface tension regulating additives such as polymeric fluorocarbon and silicone-containing, additives affecting liquid drying parameters, levelling agents, anti-foaming agents, thixotropic additives according to needs determined by a printhead and a particular printing application.

15. The ink formulation of claim 1 wherein the glass frit is at least one of a group of frits consisting of Zinc based frit and Bismuth based frit.

16. The ink formulation according to claim 15 wherein the glass frit is milled to an average particle size (D50) of less than 2 microns.

17. The ink formulation according to claim 15 wherein the glass frit comprises 5-40 wt % of the ink formulation.

18. The ink formulation according to claim 15 wherein the glass frit has a fusion temperature below 700 Centigrades.

19. The ink formulation of claim 1 wherein a fused glass frit forms a type of undulated coating, the coating is continuous over an area of substrate where the ink was deposited.

20. The ink formulation of claim 19 wherein a coating formed by the fused glass frit is non-abrasive and non-markable coating.

21. The ink formulation of claim 19 wherein a coating formed by the fused glass frit includes glass frit that maintains bulk structure, fuses solid and loses sharp edges.

22. An inkjet ink formulation, comprising:
   two immiscible liquids, each of the two immiscible liquids which comprises 1-25 wt % of the ink formulation, and a mixture of solvents;
   a third liquid capable of combining with the two immiscible liquids to give a single liquid phase, and
   a glass frit comprising 5-40 wt % of the ink formulation.

23. An inkjet ink of claim 22, wherein the third liquid evaporates rapidly enough to provoke a liquid-liquid phase separation as ink dries.

24. An inkjet ink of claim 22, wherein the glass frit has a fusion temperature below that of soda-lime glass, and an average particle size (D50) of less than 2 microns.

25. The inkjet ink of claim 22 wherein the third liquid is one of a group of liquids including a pure solvent, a solvent mixture, or a solution.

26. A method of producing a frosted surface on a substrate, comprising:
   providing a (glass) substrate;
   depositing on a glass substrate ink formulation of claim 1;
   firing the glass substrate with deposited on it ink formulation at a temperature of 700 C to fix the ink and form a light dispersing structure (a frosted surface).

27. The method of claim 26, wherein thickness of liquid ink layer on the substrate is at least 10 micron.

* * * * *